(12) United States Patent
Richter

(10) Patent No.: US 8,875,392 B2
(45) Date of Patent: Nov. 4, 2014

(54) HIGH-PRESSURE TURBINE BLADE AND PROCEDURE FOR REPAIR OF HIGH-PRESSURE TURBINE BLADES

(75) Inventor: Karl-Hermann Richter, Markt Indersdorf (DE)

(73) Assignee: MTU Aero Engines AG, Munich (DE)

( * ) Notice: Subject to any disclaimer, the term of this patent is extended or adjusted under 35 U.S.C. 154(b) by 1129 days.

(21) Appl. No.: 12/445,253

(22) PCT Filed: Oct. 10, 2007

(86) PCT No.: PCT/DE2007/001802
§ 371 (c)(1),
(2), (4) Date: Jul. 24, 2009

(87) PCT Pub. No.: WO2008/046387
PCT Pub. Date: Apr. 24, 2008

(65) Prior Publication Data
US 2010/0028158 A1 Feb. 4, 2010

(30) Foreign Application Priority Data
Oct. 18, 2006 (DE) .......................... 10 2006 049 219

(51) Int. Cl.
*C22C 29/12* (2006.01)
*B22F 3/105* (2006.01)
*B23P 6/00* (2006.01)
*B22F 7/06* (2006.01)
*F01D 5/00* (2006.01)

(52) U.S. Cl.
CPC .............. *B23P 6/005* (2013.01); *B22F 3/1055* (2013.01); *B23P 6/007* (2013.01); *B22F 7/062* (2013.01); *B22F 2998/00* (2013.01); *F01D 5/005* (2013.01); *F05D 2230/22* (2013.01)

USPC ......................................... 29/889.1; 29/402.07

(58) Field of Classification Search
CPC .......... B23P 6/002; B23P 6/007; B23P 15/02; B23P 2700/01; B21K 3/04; B21K 21/12; B21K 12/16; B23D 53/78
USPC ................. 29/889.1, 402.07, 402.08, 402.09, 29/402.11, 402.18
See application file for complete search history.

(56) References Cited

U.S. PATENT DOCUMENTS 5,972,424 A 10/1999 Draghi et al.
6,269,540 B1 * 8/2001 Islam et al. ................. 29/889.7
(Continued)

FOREIGN PATENT DOCUMENTS

DE 10 2004 051231 A1 5/2006
DE 10 2005 002609 A1 8/2006
(Continued)

OTHER PUBLICATIONS

European Patent Office; Office Action for (related) Application No. 07 817 644.3-1262; dated Dec. 20, 2011; 6 pages.
PCT/DE2007/001802 ISR, dated Jan. 28, 2008.

*Primary Examiner* — Christopher Besler
(74) *Attorney, Agent, or Firm* — Howison & Arnott, LLP

(57) ABSTRACT

The invention relates to a procedure for repair of high pressure turbine blades of an aircraft engine, with the steps:—separating a damaged section of the high pressure turbine blade; and—generating a section to replace the separated section on or upon the high pressure turbine blade by means of laser beam generation from the powder bed, as well as a high pressure turbine blade.

20 Claims, 3 Drawing Sheets

(56) References Cited

U.S. PATENT DOCUMENTS

| | | | |
|---|---|---|---|
| 6,568,077 B1 * | 5/2003 | Hellemann et al. | 29/889.1 |
| 6,609,894 B2 * | 8/2003 | Jackson et al. | 416/224 |
| 2001/0014403 A1 * | 8/2001 | Brown et al. | 428/539.5 |
| 2003/0105538 A1 | 6/2003 | Wooten | |
| 2005/0091848 A1 | 5/2005 | Nenov et al. | |

FOREIGN PATENT DOCUMENTS

| | | |
|---|---|---|
| EP | 1153699 A2 | 11/2001 |
| WO | 2004096487 A | 11/2004 |
| WO | 2006/024844 A2 | 3/2006 |
| WO | 2006024844 A2 | 3/2006 |
| WO | 2008034413 A1 | 3/2008 |

* cited by examiner

HIGH-PRESSURE TURBINE BLADE AND PROCEDURE FOR REPAIR OF HIGH-PRESSURE TURBINE BLADES

CROSS-REFERENCE TO RELATED APPLICATIONS

This application is a U.S. National Phase application submitted under 35 U.S.C. §371 of Patent Cooperation Treaty application serial no. PCT/DE2007/001802, filed Oct. 10, 2007, and entitled HOCHDRUCKTURBINEN-SCHAUFEL UND VERFAHREN ZUR REPARATUR VON HOCH-DRUCKTURBINEN-SCHAFELN, which application claims priority to German patent application serial no. DE 10 2006 049 219.3, filed Oct. 18, 2006, and entitled HOCH-DRUCKTURBINEN-SCHAUFEL UND VERFAHREN ZUR REPARATUR VON HOCHDRUCKTURBINEN-SCHAFELN, the specifications of which are incorporated herein by reference in their entireties.

TECHNICAL FIELD

The invention relates to a high-pressure turbine blade as well as a procedure for repair of a high pressure turbine blade (HPT blade).

BACKGROUND

In their interior, HPT blades have available a relatively complex system of channels for air cooling. For manufacturing such HPT blades with such a system of channels, they are cast, for example, whereby during the casting, an expensive core system is employed to form the system of channels.

Owing not least to this expensive manufacturing process, such high pressure turbine blades are very expensive, so that a single blade can evoke costs running to a five-figure amount in euros.

With this as the background, it is desirable to repair damaged high pressure turbine blades, in fact it is more cost-effective than would correspond to production of a new part.

An exemplary procedure for repair of a turbine blade is disclosed in U.S. 2005/0091848 A1. Also, DE 10 2005 002 609.5 by the applicant discloses a procedure for repair of turbine blades.

The problems presented in repair of high pressure turbine blades are considerably greater than with compressor blades. This is to be traced back not least to the discussed expensive system of channels within the high pressure turbine blade, which system of channels is lacking in compressor blades. Damage to high pressure turbine blades that appear beneath the tip area, have, so far as is known to the applicant, is in fact repairable with moderate success, with limitations existing especially regarding the overall crack length and crack position. When a replacement part is fitted in, for example via diffusion bonding or diffusion soldering, or via beam welding (LB welding or EB welding), the problem is to fit a replacement part manufactured by welding to the existing contour of the remainder of the blade sheet. However, it can deviate substantially from the desired contour.

SUMMARY

With this as a background, the task that is the basis for the invention is to produce a repair procedure for high pressure turbine blades according to one embodiment. An invention-specific high pressure turbine blade is the subject of another embodiment. Preferred embodiments are the subjects of the subordinate claims.

According to the invention, a procedure is now proposed for repair of high pressure turbine blades, and in particular for repair of high pressure turbine blades of an aircraft engine, in which initially a damaged section of the high pressure turbine blade is separated and then a section to replace the separated section is generated on or upon the high pressure turbine blade via laser beam generation from the powder bed.

BRIEF DESCRIPTION OF THE DRAWINGS

In what follows, embodiment examples of the invention will now be explained in greater detail using the figures, without the invention being thereby limited through the embodiment examples.

Shown are.

DETAILED DESCRIPTION

Figure 1:
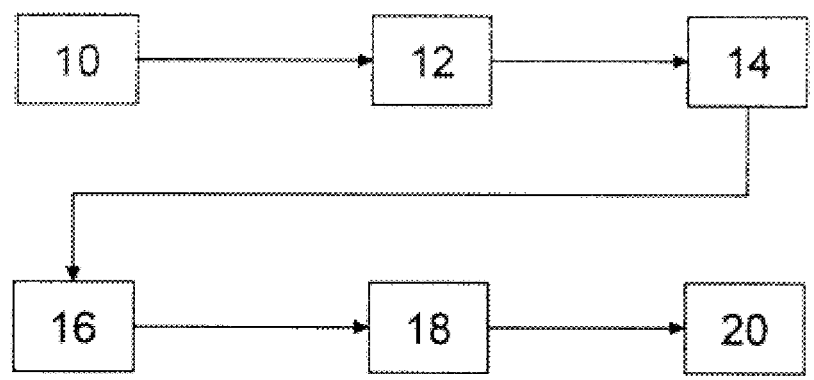
FIG. 1 illustrates a schematic sequence of an exemplary invention-specific process.

FIG. 1 shows the steps of an exemplary invention-specific process in a schematic depiction.

This procedure is for repair of high pressure turbine blades of gas turbines through laser beam generation—especially directly—from the powder bed.

Figure 2:
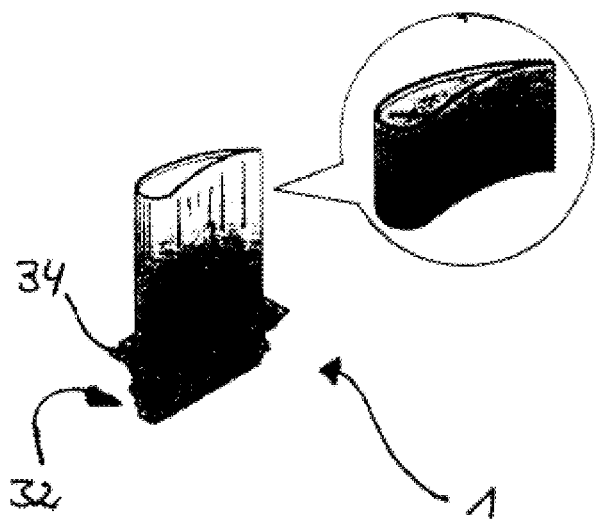
FIG. 2 illustrates a schematic depiction of a damaged HPT blade that can be used as part of an exemplary invention-specific procedure.
Figure 3:
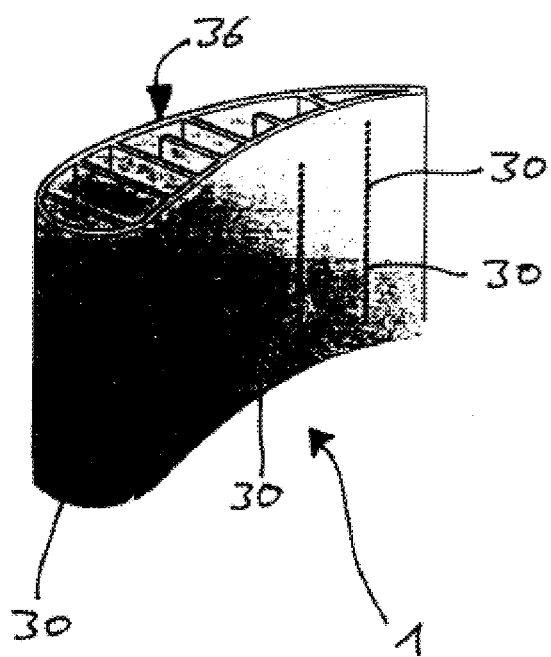
FIG. 3 illustrates a schematic depiction of a section (with a section plane) of a separated HPT blade from FIG. 2.

In step 10, a damaged area of the HPT blade is separated. Here this occurs through a standardized, flat cutting plane. Note that the cutting plane, for example, can run straight—as shown in FIGS. 2 and 3—or slanted, which is not shown in the figures. As already mentioned above, an exemplary damaged HPT blade is shown in a schematic depiction in FIG. 2. In this damaged HPT blade as per FIG. 2, cracks are found in the blade sheet. The cracks typically or exemplarily appear below the blade tip. Also schematically shown there is a multiplicity of cooling openings 30 that are made in the surface of the HPT blade and extend into its interior. The HPT blade has a blade foot 32 as well as a platform 34. Additionally, the HPT blade 1 has a blade sheet, into which the above-mentioned cooling openings 30 are inserted. The damage is not separately emphasized in the embodiment according to FIG. 2.

In the depiction according to FIG. 3, a section of the HPT blade as per FIG. 2 is shown, with a damaged section already separated and whereby in FIG. 3, in a section, the residual blade sheet after separation of a standardized area is shown. With this a structure of channels or a channel system 36 can be seen, that is provided in the interior of the HPT blade 1, and into which the cooling openings empty.

The above-mentioned standardized section planes can already be predetermined, and in fact for a multiplicity of individual HPT blades. A suitable position of this standardized section plane can be empirically determined and/or be determined from theoretical computations, or be determined theoretically via computations of the stresses arising. The standardized section plan can be determined for example using experiential values and/or statistical acquisitions or the like, and be used for various HPT blades, and in fact preferably essentially independent of the specific damage mode. In an appropriate embodiment, the section plane is determined and set in such a way that it lies in the area of lesser stresses, or in an area in which lesser stresses appear when the blade is in operation in an aircraft engine, whereby preferably, when the stresses are determined, intrinsic stresses and/or dynamic stresses and/or residual stresses are allowed for.

In step 12, the actual contour of the blade 1 to be repaired is determined or measured in the section plane. As mentioned, the section plane is show in FIG. 3 at the top.

In step 14, the separated HPT blade, thus the remainder of the blade that stays in place when the damaged section of the HPT blade was removed, is placed in a facility or machine for laser beam generation—especially in direct fashion—from the powder bed. With this, in an advantageous embodiment a machine or facility is used in which simultaneously a multiplicity of blades can be processed, such as for example 50 blades.

In step 16, a replacement part or replacement section is built up on the separated HPT blade by laser beam generation from the powder bed. Thus here a section is generated to replace the separated section on or upon the high pressure turbine blade by means of laser beam generation from the powder bed. Laser beam generation from the powder bed can also be designated as "direct laser forming" or as "selective laser melting." Laser beam generation from the powder bed can be used for rapid manufacturing. For laser beam generation from the powder bed, the components or the replacement section can be built up on the HPT blade in layered fashion by "lumination" with a laser on a platform, preferably a flat one. After that, it, or they, is or are separated from the platform and, as will be mentioned in what follows, the generated replacement part or replacement section can be "finished." One advantage of this procedure is that the interior component contours can also be manufactured, and that the process can be fully automated.

Figure 4:
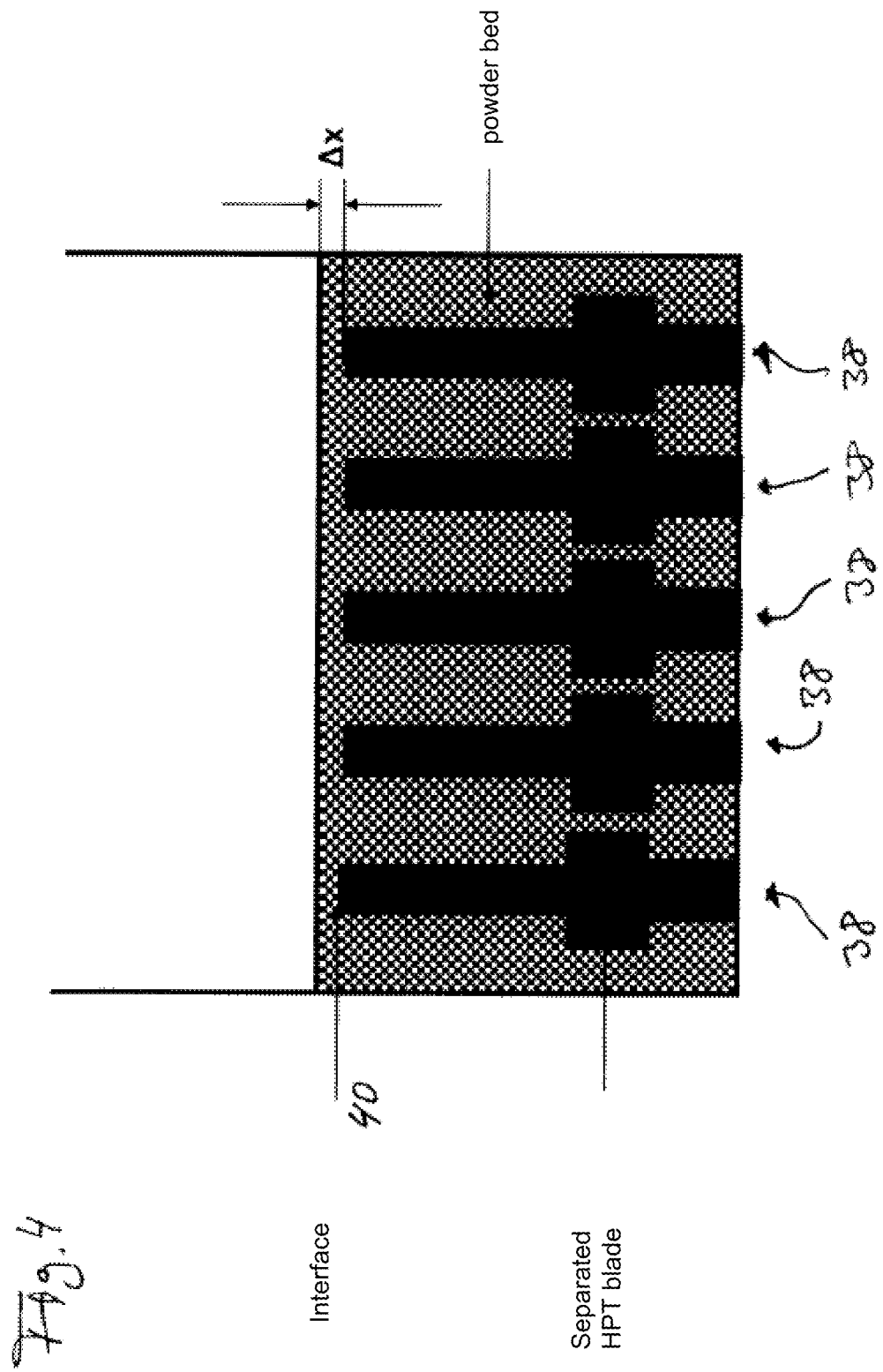
FIG. 4 illustrates a schematic depiction of the repair of HPT blades by SLM.

At first the separated HPT blade is positioned in the processing space and then the section plane is acquired in measurement-technology terms through image processing. Harmonized with this, the motion path of the laser beam for rumination of the layers of the replacement part to be generated is adapted via interpolation. FIG. 4 shows a series of five separated HPT blades after filling of the powder bed and before the first rumination, and a schematic depiction of the repair of HPT blade sheets using SLM. With this, in the areas 38, the separated HPT blades are shown. Area 40 shows an interface. The designation "Δx" indicates the "powder height" corresponding to a layer. Provision is especially made that with less "powder height," the grain size can be smaller and thus the precision can be greater.

For increasing efficiency, up to 100 or more HPT blades to be repaired can be positioned in the processing room of the facility. Finally the powder bed is filled up in such a way that the section planes of the HPT blade to be repaired lie below the surface of the powder bed (see FIG. 4) by the value Δx. The thickness of a ruminated layer corresponds to the value Δx. The smaller Δx is, the greater the precision of the generated replacement part or replacement section. Primarily what limits the value Δx is the grain distribution of the powder. In addition, Δx and the processing time behave in reversely proportional fashion to each other. Even now a layer thickness of, for example, 30 μm can be realized. But provision can also be made that the layer thickness Δx be smaller than 200 μm, preferably smaller than 100 μm, preferably 50 μm or smaller than or equal to 50 μm, preferably smaller than or equal to 40 μm, preferably smaller than or equal to 30 μm, preferably smaller than or equal to 20 μm, preferably smaller than or equal to 10 μm.

The construction of the replacement part or replacement section in the embodiment example also comprises the manufacture of cooling air holes, that must otherwise be produced conventionally through laser drilling, EDM or EC drilling.

After the SLM process or step 16, the exterior contours or contour of the generated replacement part or replacement section are finished in section 18.

Thereafter in step 20, additional, possibly necessary, procedural steps can follow, such as "alitieren" (i.e., forming aluminum protective layers) or laser drilling or the like.

As the embodiment examples especially show using the figures, the invention lays the basis for a multiplicity of advantages, of which some, which can be provided as alternatives or cumulatively in whatever combination, should be mentioned in what follows: thus, the replacement part can be adapted or produced in automated fashion; additionally, a repair process for high-value or cost-intensive components results. In addition to this, the capacity of damaged blades or blade sheets to be repaired is significantly increased; additionally, for the first time an airfoil replacement of HPT blades or blade sheets becomes available, since such has not been offered to date on the world market and in the state of the art, and also has not yet been disclosed.

The invention claimed is:

1. A method for repairing high pressure turbine blades, comprising the following steps:
    separating a damaged section of a high pressure turbine blade from a remaining blade section to define a section plane on the remaining blade section;
    determining a contour of the remaining blade section at the section plane;
    covering the remaining blade section to a predetermined height over the section plane with unfused powder to form a powder bed of unfused powder, the powder bed of unfused powder simultaneously covering the remaining blade section to the predetermined height over the section plane with unfused powder and surrounding the remaining blade section around a perimeter of the remaining blade section below the section plane with unfused powder; and
    generating a replacement layer for the damaged section on the remaining blade section from the powder bed using a laser beam to illuminate a first portion of the unfused powder covering the remaining blade section to selectively build up a fused powder layer on the remaining blade section;
    covering the remaining blade section to the predetermined height over the replacement layer with the unfused powder to form a subsequent powder bed of unfused powder at least one further time; and
    generating one or more subsequent replacement layers for the damaged section on the remaining blade section from each subsequent powder bed using the laser beam to illuminate a second portion of the unfused powder covering the remaining blade section to selectively build up one or more additional fused powder layers on the remaining blade section until the damaged section is replaced by the replacement layer and the one or more subsequent replacement layers.

2. A method according to claim 1, wherein the step of separating the damaged section of the high pressure turbine blade further comprises:
    determining at least one standardized section plane; and
    separating the damaged section from the remaining blade section in correspondence to the standardized section plane.

3. A method according to claim 2, further comprising the steps:
   measuring the actual contour of the remaining blade section to be repaired in the section plane; and
   wherein this step occurs at one of before the step of generating a replacement layer and after the step of separating the damaged section of the high pressure turbine blade.

4. A method according to claim 1, further comprising, after the step of separating the damaged section and before the step of generating a replacement layer, the following steps:
   placing the remaining blade section in a facility of the type used for rapid manufacturing using direct laser beam generation.

5. A method according to claim 1, further comprising, after the step of generating the replacement layer by means of laser beam generation from the powder bed of unfused powder, the following steps:
   finishing an outer contour of the replacement layer.

6. A method according to claim 5, further comprising, after at least one of the steps of i) generating the replacement layer using laser beam generation from the powder bed and ii) finishing the outer contour of the replacement layer, at least one of the following steps:
   aluminizing the high pressure turbine blade; and
   laser-drilling the high pressure turbine blade.

7. A method according to claim 6, wherein at least one of the steps of i) aluminizing the high pressure turbine blade and ii) laser-drilling the high pressure turbine blade, is performed in the area of the replacement layer or one or more subsequent replacement layers.

8. A method for repairing high pressure turbine blades, comprising the following steps:
   determining at least one standardized section plane in a high pressure turbine blade;
   separating a damaged section of a high pressure turbine blade from a remaining blade section to be repaired, the separation occurring along the at least one standardized section plane;
   measuring an actual contour of the blade section to be repaired along the at least one standardized section plane;
   determining, at the section plane, a contour of the remaining blade section;
   covering the remaining blade section to a predetermined height over the standardized section plane with unfused powder to form a powder bed of unfused powder, the powder bed of unfused powder simultaneously covering the remaining blade section to the predetermined height over the standardized section plane with unfused powder and surrounding the remaining blade section around a perimeter of the remaining blade section below the standardized section plane with unfused powder; and
   generating a replacement section for the damaged section on the remaining blade section from the powder bed using a laser beam to selectively illuminate a first section of the unfused powder covering the remaining blade section to selectively build up a fused powder layer on the remaining blade section.

9. A method according to claim 8, wherein the step of generating a replacement section further comprises placing the remaining blade section in a facility for direct laser beam generation from the powder bed of unfused powder.

10. A method according to claim 8, wherein the step of generating a replacement section further comprises:
   a) covering the remaining blade section with unfused powder in the powder bed to a predetermined powder height over the standardized section plane;
   b) illuminating the unfused powder covering the standardized section plane with a laser beam to build up a layer of the remaining blade using selective laser melting; and
   repeating steps a) and b) until the replacement section is complete.

11. A method according to claim 10, wherein the predetermined powder height over the section plane is within the range from about 200 μm to about 10 μm.

12. A method according to claim 10, wherein the predetermined powder height over the section plane is within not greater than 10 μm.

13. A method according to claim 8, further comprising, after the step of generating the replacement section, the following steps:
   finishing the outer contour of the replacement section.

14. A method according to claim 8, further comprising the step of forming cooling air holes in the replacement section after the step of generating the replacement section.

15. A method according to claim 14, wherein the cooling air holes are formed using one of i) laser drilling; ii) EDM and iii) EC drilling.

16. A method according to claim 1, wherein the predetermined powder height over the section plane is within the range from about 200 μm to about 10 μm.

17. A method according to claim 1 wherein the predetermined powder height over the section plane is within not greater than 10 μm.

18. A method for repairing high pressure turbine blades, including:
   separating a damaged section of each of a plurality of high pressure turbine blades from a remaining blade section to define a section plane on each of the remaining blade sections and placing the remaining blade sections of the plurality of high pressure turbine blades in a processing enclosure;
   filling the processing enclosure with unfused powder to a predetermined height above the section plane of at least one of the remaining blade sections to form a powder bed of unfused powder, the unfused powder simultaneously covering the remaining blade section to a predetermined height above the section plane and surrounding the remaining blade section around a perimeter of the remaining blade section below the section plane with unfused powder;
   generating a replacement layer for the damaged section of the at least one remaining blade section of at least one of the high pressure turbine blades from the powder bed of unfused powder using a laser beam to illuminate a first portion of the unfused powder to selectively build up a fused powder layer on the remaining blade section;
   covering the remaining blade section to the predetermined height over the replacement layer with the unfused powder to form a subsequent powder bed of unfused powder at least one further time; and
   generating one or more subsequent replacement layers for the damaged section on the remaining blade section from each subsequent powder bed using the laser beam to illuminate a section portion of the unfused powder covering the remaining blade section to selectively build up one or more additional fused powder layers on the remaining blade section until the damaged section is replaced by the replacement layer and the one or more subsequent replacement layers.

19. A method according to claim 18, wherein the predetermined powder height over the section plane is within the range from about 200 μm to about 10 μm.

20. A method according to claim 18 wherein the predetermined powder height over the section plane is within not greater than 10 μm.

\* \* \* \* \*